E. A. PETERS AND J. T. WELHOEFER.
HOGPEN.
APPLICATION FILED AUG. 29, 1917.
1,337,262. Patented Apr. 20, 1920.
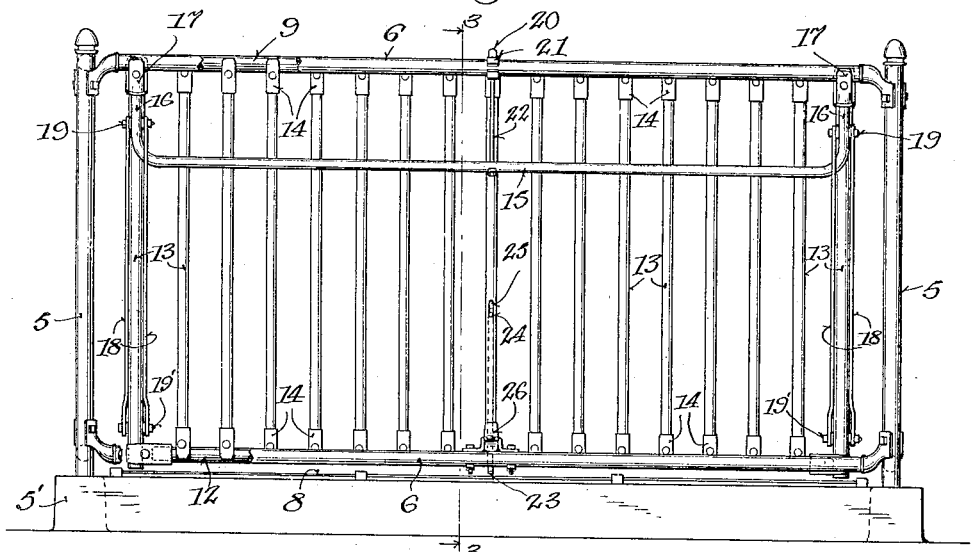
Fig. 1.
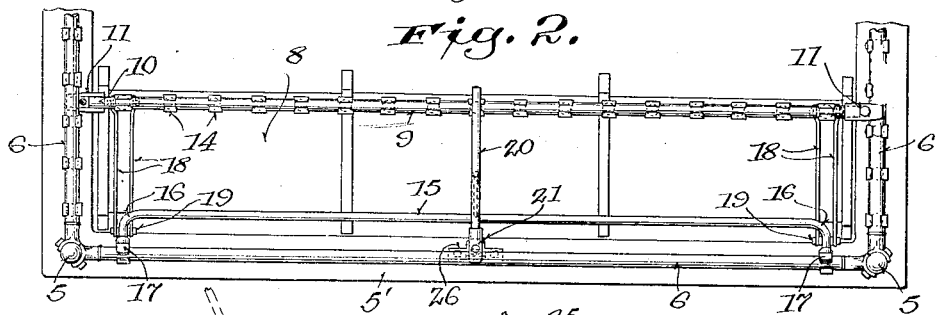
Fig. 2.
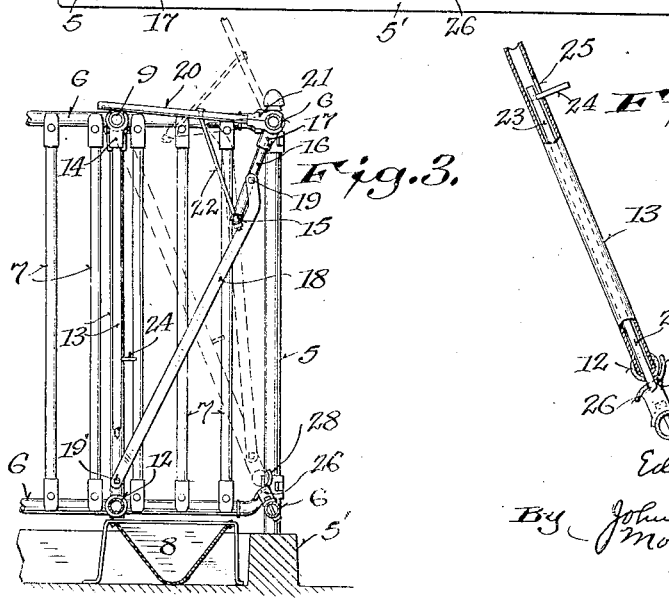
Inventors
Edward A. Peters
John T. Welhoefer
By Morsell, Kearney & French
Attorneys.

UNITED STATES PATENT OFFICE.

EDWARD A. PETERS AND JOHN T. WELHOEFER, OF WATERLOO, WISCONSIN, ASSIGNORS TO DREW CARRIER COMPANY, OF WATERLOO, WISCONSIN, A CORPORATION OF WISCONSIN.

HOGPEN.

1,337,262.     Specification of Letters Patent.     Patented Apr. 20, 1920.

Application filed August 29, 1917. Serial No. 188,738.

*To all whom it may concern:*

Be it known that we, EDWARD A. PETERS and JOHN T. WELHOEFER, citizens of the United States, and residents of Waterloo, in the county of Jefferson and State of Wisconsin, have invented new and useful Improvements in Hogpens, of which the following is a description, reference being had to the accompanying drawings, which are a part of this specification.

The invention relates to animal pens.

The invention is more particularly designed to provide a gate for a hog pen which may be swung outwardly to allow access to the feed trough and swung inwardly to prevent access to said trough.

The invention further consists in the several features hereinafter described.

In the drawings:

Figure 1 is a front view of the device embodying the invention;

Fig. 2 is a plan view thereof, parts being broken away;

Fig. 3 is a section taken on the line 3—3 of Fig. 1;

Fig. 4 is a detail view of the lock, parts being broken away and parts being shown in section.

In the drawings we have shown the usual form of sanitary pen comprising corner posts 5, mounted in the concrete floor 5′, horizontal frame members 6, uprights 7 secured to the members 6, and a trough 8 disposed adjacent one side of the pen.

In order that the animals may be prevented from gaining access to the trough until the proper time we provide a swinging gate comprising a horizontal member 9 pivotally secured in bearings 10 formed in couplinge 11 secured to adjacent upper frame members 6, a horizontal member 12, and uprights 13 connected to the members 9 and 12 by couplings 14.

Means are provided for swinging and securing the gate in operative position consisting of bar 15 having curved ends 16 pivotally secured to the upper frame member 6 at one side of the pen by couplings 17, pairs of links 18 pivotally secured at their upper ends by bolts 19 to the curved ends 16 of the bar 15 and pivotally secured at their lower ends by bolts 19′ to the lower ends of the end uprights 13, a lever 20 pivotally secured at one end by a coupling 21 to the upper frame member 16 at one side of the pen, and a rod 22 connected at one end to the lever 20 and at the other to the bar 15. When the gate is swung in to prevent access to the trough, the lever 20 and bar 15 are swung down and the pivotal points of the links 18 are brought into line to lock the gate against movement due to any pressure exerted by the animals in the pen against it, as will appear from Fig. 3.

To secure the gate in inoperative position we provide a latch rod 23 slidably mounted in the central upright 13 of the gate and provided with a handle 24 projecting through a slot 25 in said upright, said rod coöperating with an inclined latch plate 26 secured to the lower frame member 6 of the pen and provided with an aperture 27 for receiving the end of the rod, and a stop 28 for limiting the outward movement of the gate.

With this construction above described when the operator desires to prevent access of the animals to the trough 8, he moves the lever 20 backwardly thereby moving the bar 15 downwardly, and the lower portions of the links 18 and the gate inwardly where they are secured against movement by the animal due to their arrangement. When access to the trough is desired the lever 20 is swung upwardly thereby moving the bar 15 upwardly together with the links 18 which are also moved forwardly and swing the lower end of the gate forwardly away from the trough, and the latch rod 23 rides over the inclined plate 26 and drops into the aperture 27 to secure the gate against movement, the latch being released by the operator sliding the rod 23 upwardly through the means of the handle 24.

The invention thus exemplifies a simple and efficient construction for the purpose described.

What we claim as our invention is:

1. In an animal pen, the combination with the pen structure and a trough disposed at one end thereof, of a guard gate for the trough pivotally secured to the pen structure and including a plurality of spaced uprights, a bar pivotally secured to the pen structure, links pivotally connecting the bar with the lower portion of the gate, and adapted to lock the gate against movement by an animal when the gate is in guarding position, means for turning the bar to swing the gate, a latch concealed within one of the uprights of the gate, and a keeper engageable by said latch when the gate is in inoperative position to secure the gate against movement.

2. The combination with a pen structure provided with corner posts, horizontal frame members connecting the corner posts, spaced uprights secured to the frame members and a trough disposed adjacent one side of the pen, of a swinging gate for the end of the pen adjacent the trough and including substantially parallel rods and uprights connecting the same, bearing brackets fixed to the adjacent upper frame members and spaced from their ends adjacent the trough, the ends of the top rod being journaled in said bearing brackets to pivotally suspend the gate, a bar having curved ends pivotally secured to the upper frame member at the side of the pen adjacent the trough, link members having their lower ends pivoted to the outermost uprights of the gate and their upper ends bent inwardly and pivoted to the curved ends of said bar, and means for turning the bar to swing the gate through said link connections substantially as described.

3. The combination with a pen structure provided with corner posts, horizontal frame members connecting the corner posts, spaced uprights secured to the frame members and a trough disposed adjacent one side of the pen, of a swinging gate for the end of the pen adjacent the trough and including substantially parallel rods and uprights connecting the same, bearing brackets fixed to the adjacent upper frame members and spaced from their ends adjacent the trough, the ends of the top rod being journaled in said bearing brackets to pivotally suspend the gate, a bar having curved ends pivotally secured to the upper frame member at the side of the pen adjacent the trough, link members having their lower ends pivoted to the outermost uprights of the gate and their upper ends bent inwardly and pivoted to the curved ends of said bar, a lever pivoted to the frame member carrying said bar, means connecting said lever to said bar, said lever being adapted to swing the gate outwardly of the trough upon movement on its pivot, a keeper secured to the lower frame member adjacent the trough, and means carried by one of the uprights of said gate and engageable with said keeper when the gate is swung outwardly to permit access to the trough whereby the gate is locked in said outward position substantially as described.

In testimony whereof we affix our signatures.

EDWARD A. PETERS.
JOHN T. WELHOEFER.